United States Patent
Rennie et al.

(10) Patent No.: US 9,761,221 B2
(45) Date of Patent: Sep. 12, 2017

(54) ORDER STATISTIC TECHNIQUES FOR NEURAL NETWORKS

(71) Applicant: Nuance Communications, Inc., Burlington, MA (US)

(72) Inventors: Steven John Rennie, Toronto (CA); Vaibhava Goel, Chappaqua, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/831,028

(22) Filed: Aug. 20, 2015

(65) Prior Publication Data
US 2017/0053644 A1     Feb. 23, 2017

(51) Int. Cl.
| | |
|---|---|
| *G10L 15/12* | (2006.01) |
| *G10L 15/06* | (2013.01) |
| *G10L 25/30* | (2013.01) |
| *G10L 15/16* | (2006.01) |
| *G06N 3/08* | (2006.01) |

(52) U.S. Cl.
CPC ............. *G10L 15/063* (2013.01); *G06N 3/08* (2013.01); *G10L 15/16* (2013.01); *G10L 25/30* (2013.01)

(58) Field of Classification Search
CPC ......... G10L 15/16; G10L 15/20; G10L 15/02; G10L 15/10; G10L 25/24; G10L 15/063; G10L 15/32; G10L 21/0208; G10L 25/30; G10L 15/04; G10L 15/06; G10L 15/142; G10L 15/144; G10L 15/22; G10L 15/28; G10L 15/30; G10L 15/34; G10L 2015/088; G10L 25/15; G10L 25/27; G06F 17/274; G06F 17/2785; G06F 17/30684;
(Continued)

(56) References Cited

U.S. PATENT DOCUMENTS

| | | | | |
|---|---|---|---|---|
| 5,734,793 A | * | 3/1998 | Wang | G10L 15/02 704/232 |
| 5,832,181 A | * | 11/1998 | Wang | G10L 15/16 704/232 |

(Continued)

OTHER PUBLICATIONS

International Search Report and Written Opinion for International Application No. PCT/US2016/047289 dated Nov. 8, 2016.
(Continued)

*Primary Examiner* — Vijay B Chawan
(74) *Attorney, Agent, or Firm* — Wolf, Greenfield & Sacks, P.C.

(57) ABSTRACT

According to some aspects, a method of classifying speech recognition results is provided, using a neural network comprising a plurality of interconnected network units, each network unit having one or more weight values, the method comprising using at least one computer, performing acts of providing a first vector as input to a first network layer comprising one or more network units of the neural network, transforming, by a first network unit of the one or more network units, the input vector to produce a plurality of values, the transformation being based at least in part on a plurality of weight values of the first network unit, sorting the plurality of values to produce a sorted plurality of values, and providing the sorted plurality of values as input to a second network layer of the neural network.

17 Claims, 7 Drawing Sheets

(58) Field of Classification Search
CPC ... G06N 3/063; G06N 3/08; G06N 3/02; G06N 3/0454; G06N 99/007
USPC ....... 704/232, 202, 236, 219, 231, 241, 243, 704/259
See application file for complete search history.

(56) References Cited

U.S. PATENT DOCUMENTS

| | | | | |
|---|---|---|---|---|
| 5,903,863 | A * | 5/1999 | Wang | G10L 15/04 704/231 |
| 7,346,497 | B2 * | 3/2008 | Pi | G10L 15/16 704/202 |
| 7,774,202 | B2 * | 8/2010 | Spengler | G10L 15/20 704/236 |
| 8,838,446 | B2 * | 9/2014 | Jeong | G10L 15/02 704/202 |
| 9,053,431 | B1 * | 6/2015 | Commons | G06N 3/0454 |
| 9,153,230 | B2 * | 10/2015 | Maaninen | G10L 15/16 |
| 9,280,968 | B2 * | 3/2016 | Bocchieri | G10L 25/24 |
| 2005/0015251 | A1 * | 1/2005 | Pi | G10L 15/16 704/232 |
| 2009/0043722 | A1 * | 2/2009 | Nugent | G06N 3/063 706/25 |
| 2009/0228416 | A1 * | 9/2009 | Nugent | B82Y 10/00 706/33 |
| 2015/0199963 | A1 * | 7/2015 | Maaninen | G10L 15/28 704/232 |

OTHER PUBLICATIONS

Guoqiang, Neural Networks for Classification: A survey. IEEE Transactions on systems, man, and cybernetics—part c: applications and reviews. 2000;30(4):451-62.
Rennie et al., Deep order statistic networks. 2014 IEEE Spoken Language Technology Workshop (SLT). Dec. 7, 2014;124-8.

* cited by examiner

PRIOR ART

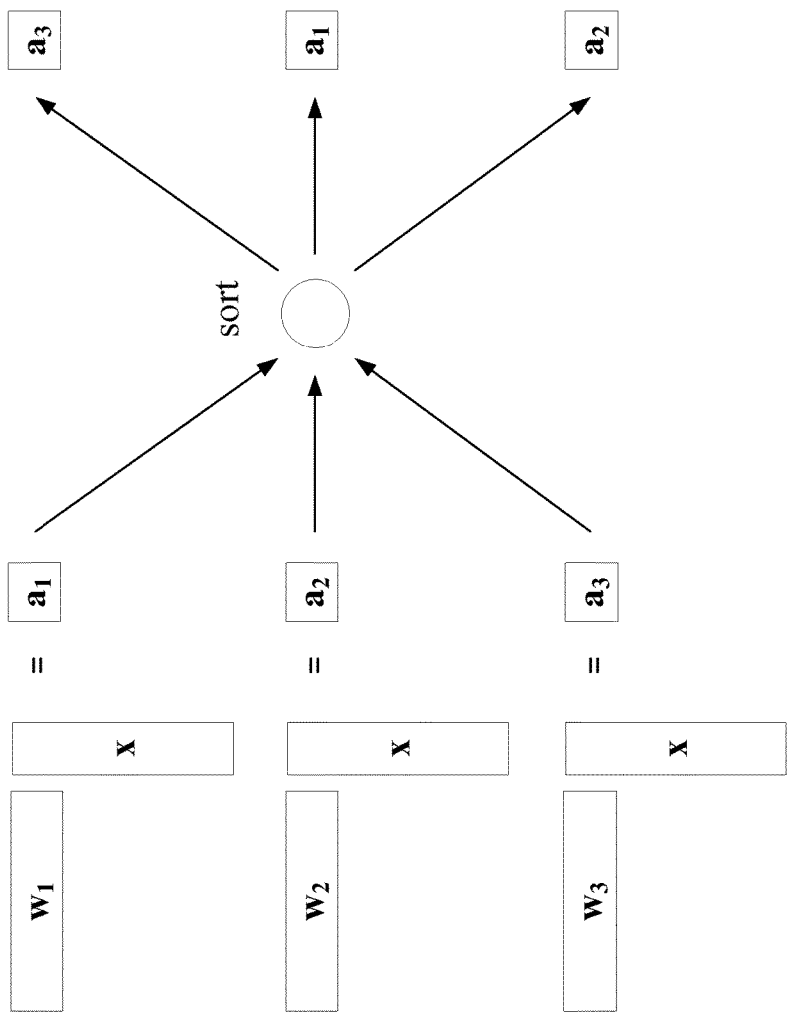

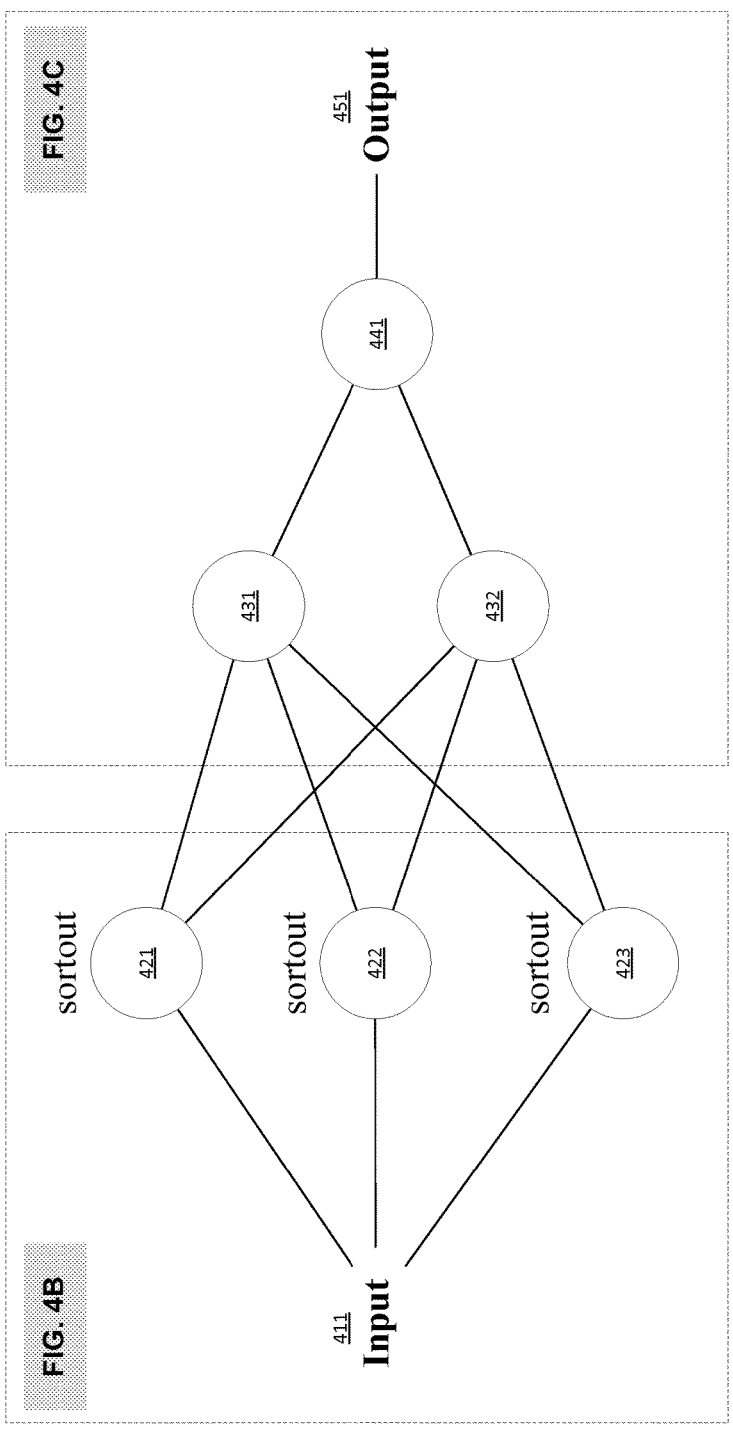

ORDER STATISTIC TECHNIQUES FOR NEURAL NETWORKS

BACKGROUND

Neural networks are frequently employed in the field of machine learning to approximate unknown functions that can depend on a large number of inputs. Typically, a neural network (or simply "network") comprises a number of interconnected units that send messages to one another. Each network unit has associated weight values that can be tuned based on labeled training data, which is input data for which corresponding outputs ("labels") are known. Thereby, the network may be adapted (or "trained") to produce a suitable output when subsequently presented with unlabeled input data.

In some cases, training of a neural network based on labeled training data may result in a network that is so closely tuned to the training data that it does not produce meaningful results on unlabeled data that is different, but similar to, the labeled training data. This can be due to the network "overfitting" its tunable parameters to apparent characteristics of the training data that are, in actuality, sampling noise. Thereby, by overfitting to the training data the network may not have applicability to subsequent unlabeled data.

SUMMARY

According to some aspects, a method of classifying speech recognition results using a neural network is provided, the neural network comprising a plurality of interconnected network units, each network unit having one or more weight values, the method comprising using at least one computer, performing acts of providing a first vector as input to a first network layer comprising one or more network units of the neural network, transforming, by a first network unit of the one or more network units, the input vector to produce a plurality of values, the transformation being based at least in part on a plurality of weight values of the first network unit, sorting the plurality of values to produce a sorted plurality of values; and providing the sorted plurality of values as input to a second network layer of the neural network.

According to some aspects, at least one computer readable storage medium is provided storing instructions that, when executed by at least one processor, perform a method of classifying speech recognition results using a neural network comprising a plurality of interconnected network units, each network unit having one or more weight values, the method comprising providing a first vector as input to a first network layer comprising one or more network units of the neural network, transforming, by a first network unit of the one or more network units, the input vector to produce a plurality of values, the transformation being based at least in part on a plurality of weight values of the first network unit, sorting the plurality of values to produce a sorted plurality of values, and providing the sorted plurality of values as input to a second network layer of the neural network.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 2 depicts an illustrative sortout network unit, according to some embodiments;

FIG. 4A depicts an illustrative neural network including a layer of sortout units, according to some embodiments;

DETAILED DESCRIPTION

As discussed above, some neural networks when trained may overfit to the labeled training data. Neural networks with multiple and often numerous layers (sometimes called "deep" neural networks) typically contain many network units and therefore have a large number of tunable parameters, which makes them able to learn very complex relationships between their inputs and outputs. However, these same characteristics can also lead to overfitting on labeled training data, particularly if the size of the training data set is limited. Due to the large number of tunable parameters, many of the parameters may not be able to converge on values having general applicability to unlabeled data unless the labeled training data set is very large. Accordingly, when a deep network trained on labeled training data is applied to unlabeled data or test data, the network's performance may deviate from the desired performance. This may be the case even if the training data and the test data are drawn from the same distribution. Test data refers generally to input data provided to a trained neural network for which the correct output is not known, for example, input data provided to a neural network deployed in a system to perform the operations the neural network was trained to perform.

Figure 1A:
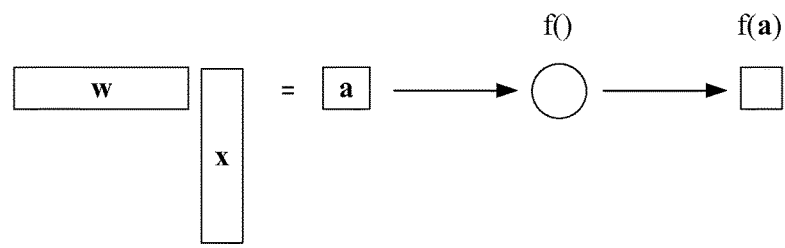
FIG. 1A depicts a conventional network unit.
Figure 1B:
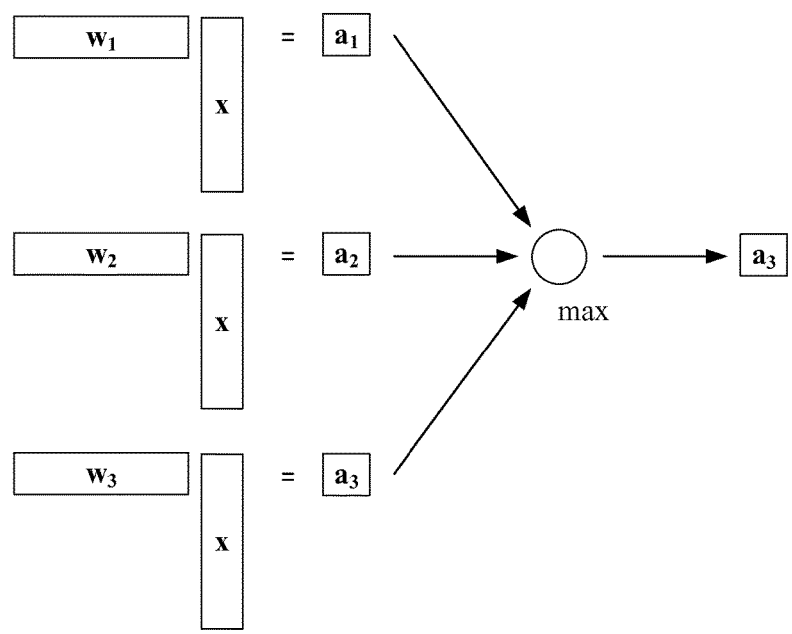
FIG. 1B depicts a maxout network unit.

Some techniques to address overfitting attempt to perform averaging over a number of possible network configurations, thus averaging out effects like transient sampling noise in a set of training data. One such technique utilizes a network unit that outputs the maximum value from a set of values produced within the unit. This so-called "maxout" unit is depicted in FIG. 1B. For comparison, FIG. 1A illustrates a conventional network unit that receives an input vector x and transforms the input vector using a weight vector w to produce an output value a. The transformation may be a linear transformation, such as an inner product (e.g., $a=x_1w_1+x_2w_2+ \ldots +x_nw_n$). The value a may have a non-linear function f( ) applied to it, such as a logistic function, thereby producing f(a) as an output from the network unit. During training of a neural network, the values of the weight vector w are tuned by passing labeled training data (e.g., training data for which the desired output is known) through the network and comparing the network's behavior to the intended behavior. By providing the neural network with sufficient training data as input and modifying the neural network based on the comparison, the neural network can be trained to produce the desired output from the corresponding input.

The so-called "maxout" unit shown in FIG. 1B includes multiple weight vectors that are each applied to an input vector x to produce a number of respective output values $a_1$, $a_2$ and $a_3$. The maxout unit then takes the maximum of these values and outputs the maximum value from the network unit.

The inventors have recognized and appreciated that, by selecting only the maximum value within a maxout unit, information about other models (the models each being represented by a weight vector) is thereby lost. For instance, in a maxout unit, only the weight vector that produces the largest output value has any effect on the output of the network unit. In the example of FIG. 1B, weight vectors $w_1$ and $w_2$ do not contribute to the output since $a_3$, which was produced using $w_3$, corresponds to the maximum value. The inventors have recognized that subsequent units in the network may be able to utilize information about other models, even though these models may not have produced the highest value output when applied to an input vector.

Based on this insight, the inventors have developed a network unit configured to evaluate multiple models and generate output indicative of the performance of these models. According to some embodiments, a sorted list of output values from a network unit is produced, wherein each output value represents the performance of a respective model upon an input to the unit. Subsequent units in the network may then utilize values produced by each model. The significance of each value may be effectively encoded in its position in the sorted list of values. For example, the maximum value may always appear first in the list of sorted values. Information about the relative significance of each output value may thereby be implicitly provided to subsequent network units. For instance, weight vectors in one of the network units that perform sorting (which may be termed "sortout units") may each represent a model that is applied to the unit's input (e.g., applied through a linear combination of weight values w and input values x). Values produced from each weight vector's application to the input vector are sorted and output from the sortout unit as a sorted list of values.

In some embodiments, a neural network may comprise a layer of "sortout" network units. Each of the sortout units may output a sorted list of values produced by operating on an input vector (e.g., by applying a plurality of weight vectors). The resulting plurality of sorted lists may then be provided to network units in a subsequent layer of the network. In some implementations, a single output vector (or other suitable ordered list of values) in which the plurality of sorted lists are combined in such a way to preserve the sorted order of each list may be supplied to a second network layer. For instance, the sorted lists may be concatenated together to produce a single ordered list. The single ordered list provides an output vector of the layer of sortout units, which may in turn be provided as the input vector to a subsequent layer in the network. For example, each unit of the subsequent network layer may receive an input vector that includes the combination of sorted lists output from the layer of sortout units. As noted above, this vector may provide information about the ordering produced by each of the preceding layer's sortout units via the position of each value in the output vector, which implicitly conveys the value's significance. In other implementations, values output by each sortout unit in a layer of sortout units may be assembled in an output vector (or other suitable ordered list of values) and then sorted as a whole before being provided to a second network layer.

In some embodiments, a subset of a sorted list output from a sortout unit may be provided to one or more network units in a subsequent layer of a neural network. The subset may include any suitable subset that may be generated from the ordered values, such as, but not limited to, the N largest values (where N is an integer value), the N smallest values, a median value or N values adjacent to each other in the ordered list that include the median.

FIG. 2 depicts an illustrative sortout network unit, according to some embodiments. Exemplary sortout unit 200 includes three weight vectors $w_1$, $w_2$ and $w_3$ that are each applied to input vector x, thereby producing values $a_1$, $a_2$ and $a_3$. The sortout unit sorts values $a_1$, $a_2$ and $a_3$ in either ascending or descending order to produce output values from the sortout unit. In the example of FIG. 2, the sorted order produced is $a_3$, $a_1$ then $a_2$. For instance, $a_3$ may be the largest value and $a_2$ the smallest value; alternatively, $a_2$ may be the largest value and $a_3$ the smallest value, depending on whether the sorting is performed in descending or ascending order, respectively. In either case, the values output from the application of each weight vector to an input vector are ordered in ascending or descending order of value.

According to some embodiments, the weight vectors w of sortout unit 200 transform an input vector x using a linear transfer function to produce an output value a. In some implementations, the linear transfer function may be a linear combination of the weight values and corresponding input vector values (e.g., an inner product). For instance, x may have values $\{x_1, x_2, \ldots, x_n\}$, w may have values $\{w_1, w_2, \ldots, w_n\}$ and a may be equal to $x_1w_1+x_2w_2+\ldots+x_nw_n$. In some cases, the linear combination may include a bias term that is added to the combination of the weight values and input values.

According to some embodiments, sortout unit 200 may apply a non-linear function to values $a_1$, $a_2$ and $a_3$, which may be performed before or after the values are sorted. Suitable non-linear functions may include, but are not limited to, a sigmoid function such as the logistic function, a softmax function, a softplus function, a hyperbolic function, or combinations thereof.

In some embodiments, a neural network including one or more sortout units, such as sortout unit 200, may be applied to perform automated speech recognition (ASR). For instance, an input vector to the neural network may comprise a plurality of coefficients obtained from speech, such as log-mel coefficients and/or mel-frequency cepstral coefficients. The neural network may be configured to produce an output vector having elements that each correspond to a particular phoneme and whose values indicate the likelihood that the input coefficients correspond to the respective phoneme. As such, the output of the neural network may be a hypothesis for the phoneme sequence corresponding to the input vector. The neural network may have been trained, and weights of the network thereby tuned, on labeled training data such that providing the input vector to the network produces the output vector based on the weight values of the network. In some embodiments, such a neural network may be configured to receive hundreds, thousands or more input values, produce hundreds or thousands or more output values in response, have one million or more tunable parameters (e.g., weight values) and have multiple hidden layers (e.g., two, three, four, five, ten or more hidden layers). In some embodiments, output values from such a neural network may be used to construct a word hypothesis. It should be appreciated that a neural network may be of any size and include any number of hidden layers, as the aspects are not limited in this respect.

Figure 3:
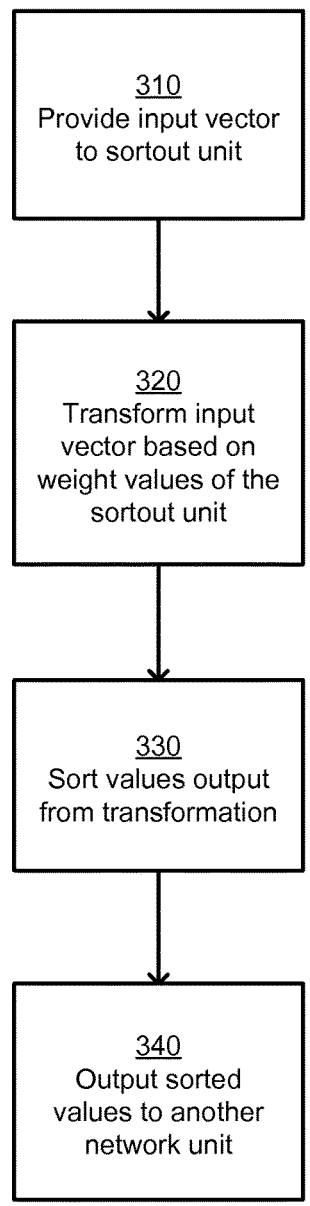
FIG. 3 is a flowchart depicting a method of using a sortout network unit to produce sorted output values, according to some embodiments.

FIG. 3 is a flowchart depicting a method of using a sortout network unit to produce sorted output values, according to some embodiments. The sortout unit of method 300 is a network unit within a neural network that includes a plurality of units (some of which also may be sortout units). In method 300, a sortout unit receives an input vector in act 310. In act 320, the input vector is transformed based on weight values of the sortout unit. In some embodiments, the sortout unit includes a plurality of weight vectors that are each separately applied to the input vector using a selected transfer function, thereby producing a plurality of values. In some implementations, the transfer function may be a linear combination of the weight vector elements and the input vector elements. In some embodiments, the weight vectors of the sortout unit may be configured to have the same number of elements as the input vector.

In act 330, values output by transforming the input vector using the weight values are sorted, which rearranges the order of the values to reflect their relative magnitudes. In some implementations, a sortout unit may be configured to produce transformed values that may, dependent on the input values and the weight values, be positive or negative, in which case an ordering of such values may either be based on relative magnitude or may instead be based on relative absolute magnitudes. The ordering of the values produced in act 330 may be represented in any suitable way. In some embodiments, the sorted values are stored in a vector wherein the vector elements have an implicit ordering. However, values may in general be stored in any suitable way that indicates their relative order. In act 340, the sorted values are output to another network unit of the neural network.

FIG. 4A depicts an illustrative neural network including a layer of sortout units, according to some embodiments. To illustrate a neural network utilizing sortout units, neural network 400 is depicted, which includes six network units arranged into three layers. An input value 411 is provided to each of sortout units 421, 422 and 423. Values output from these sortout units are provided to each of network units 431 and 432. Output values from network units 431 and 432 are provided to network unit 441, which produces an output value 451 from the network. Each of network units 421, 422, 423, 431, 432 and 441 comprise a plurality of weight values that may have been tuned during previous training of network 400. For instance, labeled training data that includes input values and their corresponding output values may have been supplied to the network 400 and the network trained to determine suitable values for the weights of each of the network units.

Figure 4B:
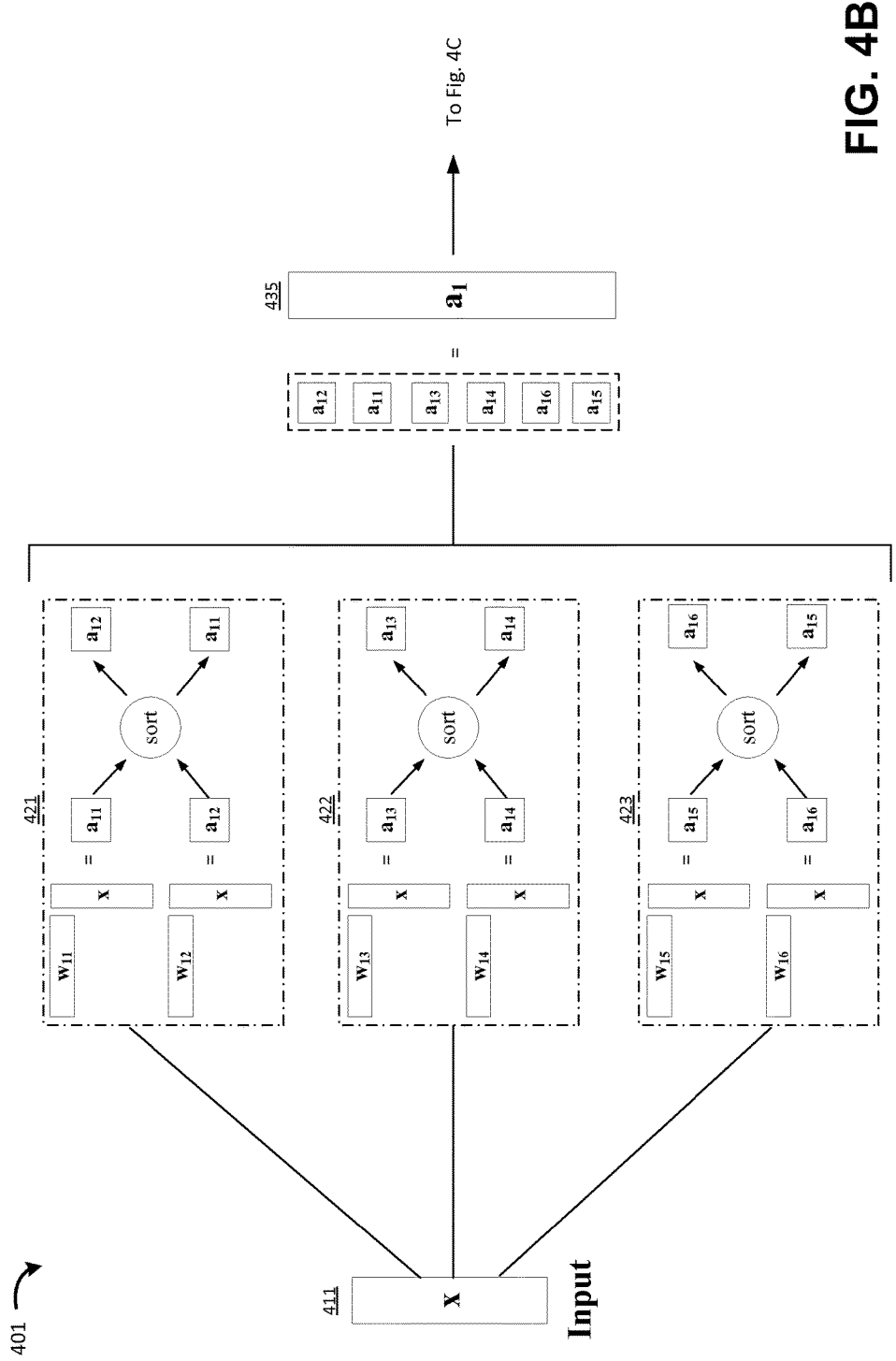
FIGS. 4B-4C depict illustrative portions of the neural network shown in FIG. 4A, according to some embodiments.

FIG. 4B depicts a first portion of neural network 400, according to some embodiments. In the example of FIG. 4B, each of the network units 421, 422 and 423 include two weight vectors that are each applied to the input vector x. For instance, sortout unit 421 transforms x using a vector $w_{11}$ to produce a value $a_{11}$, and also transforms x using a vector $w_{12}$ to produce a value $a_{12}$. As discussed above, application of a weight vector to an input vector may, in some embodiments, comprise generating a linear combination of the elements of the two vectors. In the example of FIG. 4B, sortout unit 421 sorts values $a_{11}$ and $a_{12}$ to produce the ordering $a_{12}$, $a_{11}$. Similarly, sortout unit 422 sorts values $a_{13}$ and $a_{14}$ to produce an ordering $a_{13}$, $a_{14}$ and sortout unit 423 sorts values $a_{15}$ and $a_{16}$ to produce an ordering $a_{16}$, $a_{15}$.

Outputs from the three sortout units 421, 422 and 423 are combined to produce a single vector $a_1$, which combines the outputs of each respective sortout unit whilst retaining the relative ordering determining by each sort operation. Accordingly, subsequent network units receiving $a_1$ as input may perform processing that is based on the fact that the first element of $a_1$ is greater than the second element of $a_1$ (assuming that the sort operation performed by sortout unit 421 was to sort in descending order). That is, the weight values of subsequent network units may have been tuned during training such that the weight values produce desired outputs from the network by responding to the relative sizes of the values in $a_1$.

For instance, weight vector $w_{1i}$ may have been tuned to produce a large output value when a first feature is present in input vector x and weight vector $w_{12}$ may have been tuned to produce a large output value when a second feature is present in input vector x. In this case, the weight vectors $W_{11}$ and $w_{12}$ may be viewed as "detectors" for these two features. The first two elements of vector $a_1$ will thereby indicate values of detection results of these two "detectors," which allows a subsequent layer of network units receiving $a_1$ as input to interpolate over these results. In at least some networks, during training the weight values in the subsequent layer may thereby be tuned to utilize this aspect of their input vector $a_1$, which may reduce the network's tendency to overfit to training data compared with a layer of conventional network units or a layer of maxout units.

Figure 4C:
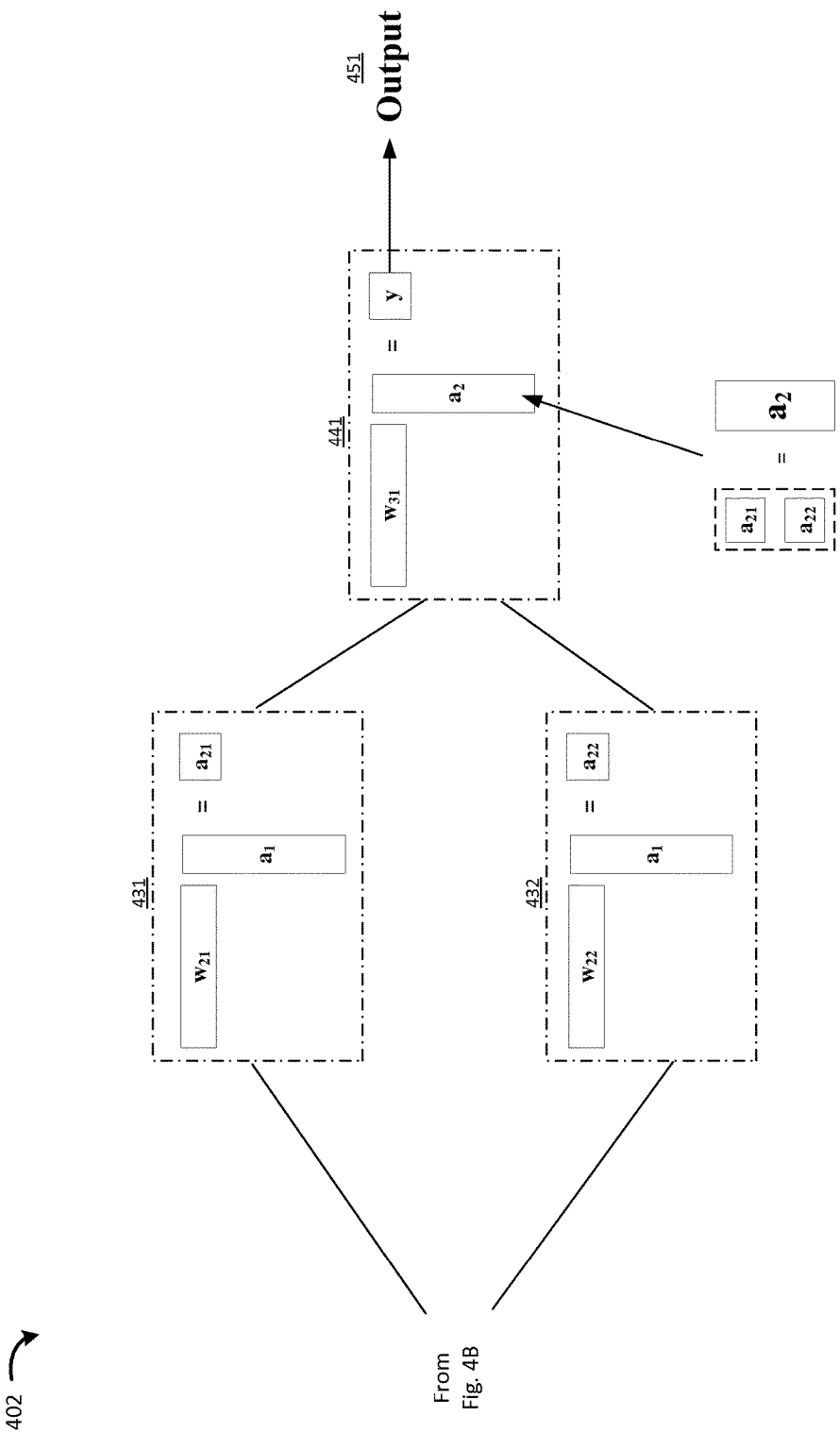

FIG. 4C depicts a second portion of neural network 400, according to some embodiments. The vector $a_1$ output from the layer of sortout units is provided as input to each of conventional network units 431 and 432, which each transform the input using a single weight vector $w_{21}$ and $w_{22}$, respectively, to produce outputs $a_{21}$ and $a_{22}$, respectively. These output values are combined to produce a vector $a_2$, which is provided as input to network unit 441. Network unit 441 transforms $a_2$ using weight vector $w_{31}$ to produce an output value y, which is output from the network.

It should be appreciated that the neural networks illustrated herein are merely exemplary to demonstrate how sorting techniques may be utilized. Any type of neural network of any size, configuration and connectivity may be used, as techniques regarding sorting output values discussed herein are not limited for use with any particular network and can be applied to networks of any type. Moreover, the neural networks illustrated herein may be applied to any suitable machine learning task or tasks, including but not limited to automated speech recognition (ASR) or other types of pattern recognition.

Figure 5:
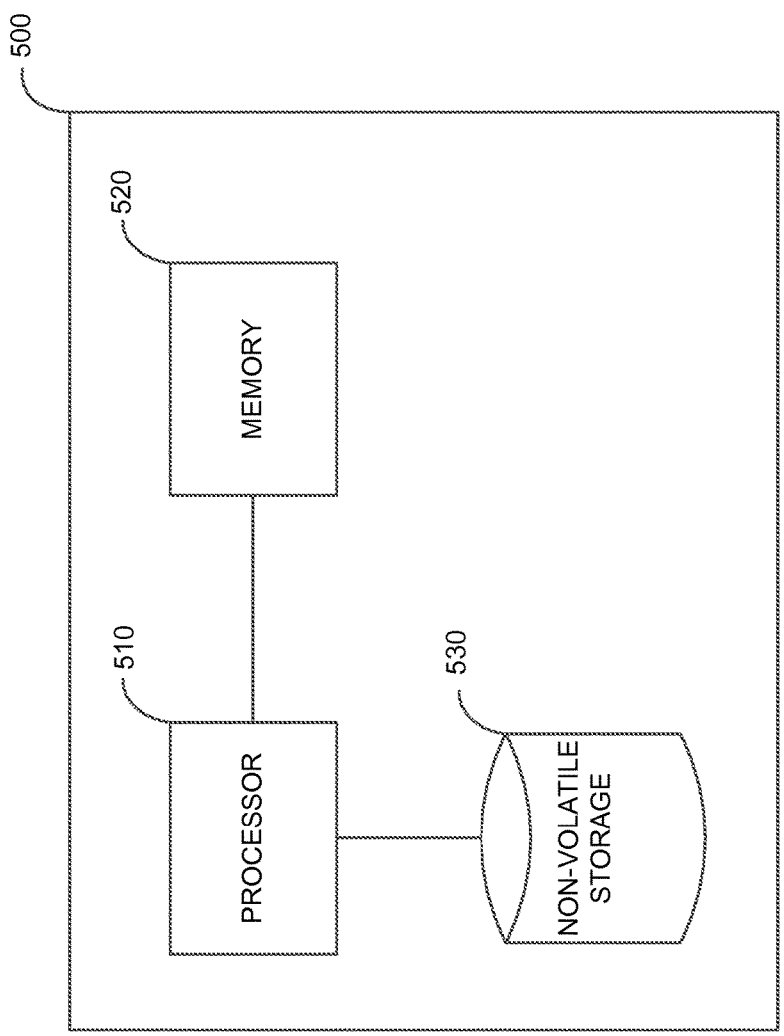
FIG. 5 illustrates an example of a computing system environment on which aspects of the invention may be implemented.

An illustrative implementation of a computer system 500 that may be used to implement a neural network including one or more sortout units as described herein is shown in FIG. 5. The computer system 500 may include one or more processors 510 and one or more non-transitory computer-readable storage media or storage devices (e.g., memory 520 and one or more non-volatile storage media 530). The processor 510 may control writing data to and reading data from the memory 520 and the non-volatile storage device 530 in any suitable manner, as the aspects of the invention described herein are not limited in this respect. To perform the functionality and/or techniques described herein, the processor 510 may execute one or more instructions stored in one or more computer-readable storage media (e.g., the memory 520, storage media, etc.), which may serve as non-transitory computer-readable storage media storing instructions for execution by the processor 510.

In connection with techniques for training and/or operating a neural network including one or more sortout units as described herein, code used to, for example, store weight values, perform training algorithms, store labeled and/or unlabeled data, produce output from the network using the network's units, etc. may be stored on one or more computer-readable storage media of computer system 500. Processor 510 may execute any such code to provide any techniques for training and/or operating a neural network as described herein. Any other software, programs or instructions described herein may also be stored and executed by computer system 500. It will be appreciated that computer code may be applied to any aspects of methods and techniques described herein. For example, computer code may be applied to determine weight values of a plurality of network units in a neural network based on labeled training data and/or may be applied to determine an output of a neural network based on previously determined weight values.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device encoded with one or more programs that, when executed on one or more computers or other processors, implement some of the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of one or more embodiments described herein need not reside on a single computer or processor, but may be distributed in a modular fashion among different computers or processors to implement various aspects of the present invention.

While particular techniques for storing and arranging numbers within a computer system have been discussed herein, it will be appreciated that the techniques described herein are not limited to any particular technique(s) for storing data within a computer system. For instance, examples described herein utilize vectors to store and order a set of values. However, the techniques described herein are not limited to the use of vectors, as any technique or techniques for storing values and an ordering of those values may be utilized. This non-limiting description applies to any of: output of a sortout unit, weight values, input values, etc.

Techniques utilized herein may be utilized with any type of neural network, such as, but not limited to any feed forward network (e.g., a multi-layer perceptron network), a radial basis function (RBF) network, autoencoders, denoising autoencoders, recurrent neural networks (RNNS), (Bi-directional) long-short-term memory networks (LSTMS), neural turing machines (NTMs), or combinations thereof. Any number of network units, including any number of hidden layers, inputs and outputs may be utilized in such a neural network. In addition, the neural network may be trained (and weight values thereby determined) using any suitable algorithm(s), which may include a fixed dropout scheme and/or an annealed dropout scheme.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Also, various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of classifying speech recognition results using a neural network comprising a plurality of interconnected network units, each network unit having one or more weight values, the method comprising:
   using at least one computer, performing acts of:
      providing a first vector as input to a first network layer comprising one or more network units of the neural network;
      transforming, by a first network unit of the one or more network units, the input vector to produce a plurality of values, the transformation being based at least in part on a plurality of weight values of the first network unit;
      sorting the plurality of values to produce a sorted plurality of values; and
      providing the sorted plurality of values as input to a second network layer of the neural network.

2. The method of claim 1, wherein the method further comprises, using the at least one computer:
   transforming, by a second network unit of the one or more network units, the input vector to produce a second plurality of values;
   sorting the second plurality of values to produce a second sorted plurality of values; and
   providing the second sorted plurality of values as input to the second network layer.

3. The method of claim 2, wherein providing the sorted plurality of values and the second sorted plurality of values as input to the second network layer comprises:

providing a second vector as input to the second network layer, wherein the second vector comprises the plurality of values and the second plurality of values.

4. The method of claim 1, wherein the neural network is a feed forward network.

5. The method of claim 1, wherein the first network layer and the second network layer are hidden layers.

6. The method of claim 1, wherein the first network unit comprises a plurality of weight vectors.

7. The method of claim 1, wherein said transformation of the input vector to produce the plurality of values includes a plurality of linear transformations.

8. The method of claim 1, wherein the method further comprises, using the at least one computer, applying a non-linear function to each of the plurality of values.

9. The method of claim 1, wherein the input vector comprises a plurality of speech recognition features.

10. The method of claim 9, wherein the speech recognition features are log-mel coefficients and/or mel-frequency cepstral coefficients.

11. The method of claim 1, wherein the input vector comprises a plurality of image features.

12. At least one non-transitory computer readable storage medium storing instructions that, when executed by at least one processor, perform a method of classifying speech recognition results using a neural network comprising a plurality of interconnected network units, each network unit having one or more weight values, the method comprising: providing a first vector as input to a first network layer comprising one or more network units of the neural network; transforming, by a first network unit of the one or more network units, the input vector to produce a plurality of values, the transformation being based at least in part on a plurality of weight values of the first network unit; sorting the plurality of values to produce a sorted plurality of values; and providing the sorted plurality of values as input to a second network layer of the neural network.

13. The at least one computer readable storage medium of claim 12, wherein the method further comprises, using the at least one computer:

transforming, by a second network unit of the one or more network units, the input vector to produce a second plurality of values;

sorting the second plurality of values to produce a second sorted plurality of values; and providing the second sorted plurality of values as input to the second network layer.

14. The at least one computer readable storage medium of claim 12, wherein the neural network is a feed forward network.

15. The at least one computer readable storage medium of claim 12, wherein the first network layer and the second network layer are hidden layers.

16. The at least one computer readable storage medium of claim 12, wherein said transformation of the input vector to produce the plurality of values includes a plurality of linear transformations.

17. The at least one computer readable storage medium of claim 12, wherein the method further comprises, using the at least one computer, applying a non-linear function to each of the plurality of values.

* * * * *